Nov. 28, 1961 L. A. BONDON 3,010,747
CONNECTORS FOR RODS OR TUBES
Filed June 2, 1958

INVENTOR.
LEWIS A. BONDON
BY Darby & Darby
ATTORNEYS

United States Patent Office 3,010,747
Patented Nov. 28, 1961

3,010,747
CONNECTORS FOR RODS OR TUBES
Lewis A. Bondon, 90 Yantacaw Brook Road,
Upper Montclair, N.J.
Filed June 2, 1958, Ser. No. 739,214
8 Claims. (Cl. 287—116)

The present invention relates to connectors for rods or tubes and more particularly to connectors which are adapted to grip unthreaded rods or tubes with a high degree of gripping strength and with a minimum of scoring or deformation of the rod or tube gripped. The present invention is adapted for use where either a high tensile strength connector, a fluid type connector, an electrical connector or a combination of the above is desired.

It is contemplated that the present invention will be particularly useful for connecting rods or bars of relatively soft material, such as plastic, or relatively soft metals, such as copper or aluminum. However, the use of the connector is not restricted to these applications, and it may be used, for example, for the connection of steel rods and steel or iron pipe as well.

The connection of rods and tubes provides numerous problems. Ideally the connection of rods and tubes should be accomplished with a minimum of time and with as few tools as possible, and particularly without requiring special tools. On the other hand a connector should be fluid-tight where it is desired to connect fluid conduits, and in all cases should be virtually as strong as the tubes or rods which it connects. A great variety of connectors are in use which utilize flare type connecting elements, soldered connecting elements, threaded connecting elements, a swaged reduction joint, or the like. Of the many connecting means in use, few, if any, approach the ideal characteristics suggested above. In each case the connection requires special tools or an unduly long time to make the connection, or provides a connection of relatively low strength.

The present invention provides a connector which upon rotation of one of its parts secures itself to a tube or rod forcing a number of cutting edges into the wall of the tube or rod which provides a connection comparable in tensile strength to the original strength of rod or tube members being connected.

No special tools are required to secure the connector to a rod or tube; in most cases only a small wrench will be required. Furthermore, in applying connectors according to the present invention no care need be taken to apply exactly the right force in tightening the connector. The connector is designed so that it virtually cannot be tightened past the desired point. The connectors of this invention may be tightened by hand, for example as a pre-assembly convenience, and when so tightened they are comparable in performance to conventional fittings.

A particular type of connector as shown in the drawings is adapted for use with radio frequency coaxial cable of the semi-flexible type. This connector is shown with this type of cable for the purpose of illustration because connections involving that type cable are relatively complicated compared with other types and thus many advantageous features of the invention are illustrated. It should be appreciated, however, that connectors according to the present invention may be adapted for use in the connection of rods or tubes of any type whatsoever. Thus they may be utilized in plumbing installations for connecting copper or brass pipes, or they may be utilized in building, mechanical, or other arts for the connection of structural steel rods. Obviously the connectors may also be utilized for connection of electrical cables other than the radio frequency or coaxial cable shown by way of illustration.

In addition to the above features and advantages of the present invention, it is an object of the present invention to provide a connector for rods, tubes or stranded cables which has a high degree of tensile strength and which produces relatively little or negligible diminution in the strength of the rod or tube to which it is secured.

It is a further object of the present invention to provide a connector which may be used without the necessity for special tools and which invariably provides a strong fluid-tight joint between connector and the tubing to which it is applied.

It is another object of the present invention to provide a connector which may be applied to rods or tubing of soft material and which may be removed from and replaced on the same tubing without replacing or in any way dressing or altering the various parts.

It is still another object of the present invention to provide a connector for rods or tubing which produces a minimum of scoring or deformation in the rods of tubing to which it is applied.

It is a still further object of the present invention to provide a connector for rods or tubing which is of inexpensive construction and yet provides great economy in use by reason of its efficiency and the speed with which it may be applied.

Other objects and advantages of the present invention will be apparent from a consideration of the following description in conjunction with the appended drawings, in which.

Figure 1:
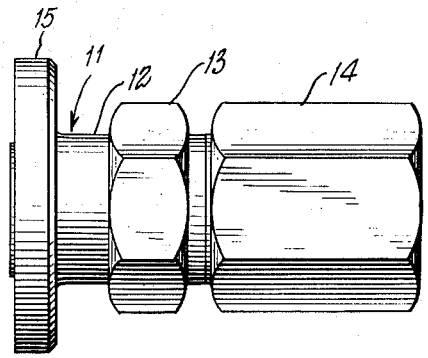
FIGURE 1 is a side elevational view of a connector according to the present invention.

Referring now to the drawings, FIG. 1 shows a connector 11 according to the present invention. Connector 11 has a body portion 12 which has an enlarged portion 13 of hexagonal external configuration so that it may readily be gripped by a wrench or similar tool, or may be turned by hand.

A compression nut 14 is threaded on the end of the connector body 12 and operates to secure a tube or rod within the connector, as will later be explained. The connector body 12 is also provided with a flange 15 which serves to secure the connector 11 to another connector or other structure.

Figure 2:
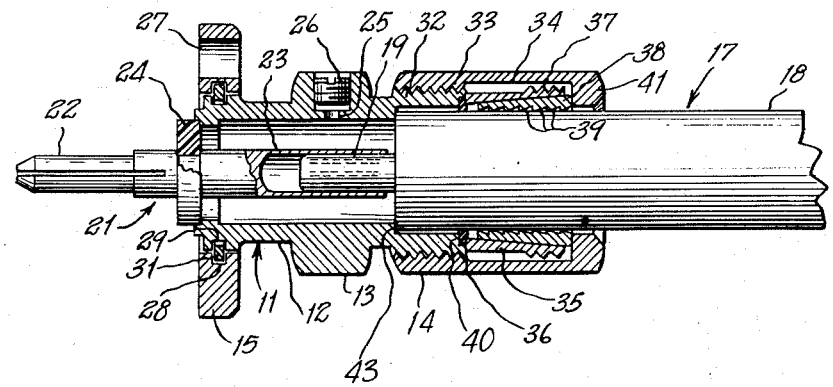
FIGURE 2 is a vertical sectional view of the connector of FIGURE 1, together with a tube and other connecting elements.

FIG. 2 shows the connector 11 in greater detail and also shows the manner in which it may be utilized to provide a fitting for a particular type of electrical cable. In FIG. 2 the connector 11 is shown adapted to connect a length of radio frequency coaxial cable to a standard connector for this type of cable. It should be understood that connectors according to the present invention may be utilized to provide a widely diverse assortment of connector structures, including connectors for solid structural rods or fluid conduits as well as connectors for various types of electrical cable. The cable 17 is provided with a jacket 18 formed of aluminum and has a center conductor 19 formed of copper which is supported centrally within the aluminum jacket 18.

If a section of cable 17 is to be prepared for a connector 11, it is only necessary that the end of the outer aluminum jacket 18 be removed for a suitable length as indicated in the drawings and that the supporting structure for the center conductor 19 be removed for a similar distance. Thereafter, any rough edges on the center conductor 19 or on the end of the cable jacket 18 may be smoothed off to facilitate assembly of the connector on the cable end. The cable 17 in FIG. 2 is shown prepared for attachment of the connector 11. A center conductor fitting 21 is provided which has a male connector portion 22 and a female connector portion 23. The female connector portion 23 is made in the form of a sleeve and fits over the center conductor 19. An insulator ring 24 is attached to the central portion of the center conductor fitting 21 and supports and insulates the fitting 21 from the connector body 12. The insulating ring 24 may be formed of any suitable insulating material, such as polyethylene, tetrafluoroethylene, nylon, or the like.

An access port 25 is provided in the body 12 of the connector 11. An access plug 26 is screwed into a threaded portion of the access port 25 to provide a closure. In the illustrated embodiment of the invention the access port 25 allows sections of the cable 17 to be purged of moisture and other contamination and to be filled with dry air or nitrogen and pressurized, or evacuated, if desired. Obviously the access port 25 and the plug 26 may be eliminated for connector applications where they are unnecessary.

The flange 15 is provided with a number of holes, one of which is shown at 27. The flange 15 may thus readily be bolted to another connector or any other structure to which it is desired to secure the cable 17. Although the connector arrangement of FIG. 2 is designed to provide a particular type of standard coaxial cable connector utilized by the military services, it is obvious that the connector may be assigned to connect the cable 17 to any desired type of structure or fitting.

A particular advantage of a connector 11 shown in FIG. 2 resides in the fact that the flange 15 is not immovably secured to the body 12 but is rotatably affixed thereto. This provides an obvious advantage in securing the connector 11 to another structure in that the holes 27 in the flange 15 may readily be aligned with holes in the structure to which it is to be connected.

The rotatable attachment of the flange 15 to the body 12 is provided by grooves 28 and 29 in the flange 15 and body 12, respectively. A split ring 31 of steel, aluminum or other material is placed within the grooves 28 and 29 in such a way that longitudinal movement of the flange 15 with respect to the body 12 is prevented while rotational movement of the flange 15 is permitted.

The flange 15 may be assembled on the body 12 by placing the ring 31 in the groove 28 and expanding it so that it will fit over the body 12 and thereafter allowing the ring 31 to contract and seat itself in the groove 29. Although the rotatable flange 15 is a very useful feature of the connector 11, it is obvious that the connector 11 may be provided with an integral flange or, in many cases, an entirely different arrangement may be desired to secure the connector 11 to particular types of elements or structures.

A novel feature of major importance in the present invention is the means provided for securing the cable 17 to the connector 11. The compression nut 14 forming a part of this means is provided with threads 33 which cooperate with threads 32 on the body 12 of the connector and allow the nut 14 to be threaded onto the connector body 12.

The compression nut 14 is provided with a portion of enlarged internal diameter as shown at 34, in which are located a tapered ring 35 and a split tapered ring 38.

The tapered ring 35 abuts against the end of the connector body 12 where there is located an O-ring 36 placed in an O-ring seat at 40. The O-ring preferably has an internal diameter equal to or greater than the external diameter of the jacket 18, thereby facilitating ready and easy preassembly while the O-ring is in place. The tapered ring 35 deforms the O-ring 36 and causes it to be forced against the jacket 18 of the cable 17 to form a fluid type seal between the cable 17 and the connector 11. In some cases the O-ring 36 may be omitted; in particular where the connector is utilized in an application were it is not necessary to provide a fluid-tight seal. Even where a fluid-tight seal is desired, it will be noted that the jacket 18 of the cable 17 abuts against the shoulder 43 and the body 12 of the connector 11 and provides a fluid seal independent of O-ring 36. As will later be explained, the jacket 18 is pressed against the shoulder 43 with substantial force, and usually this force will be sufficient to provide a fluid-tight seal at the shoulder 43. Therefore the O-ring 36 need be used only where an abundance of precaution is desired.

The tapered ring 35 is provided with external threads 37 along a portion thereof. These threads prevent the tapered ring 35 and the split tapered ring 38 from accidentally falling out of the compression nut 14 even when the compression nut 14 is completely removed from the conductor body 12. When desired, however, the tapered ring 35 may be removed from the compression nut 14 by threading it past the threads 33. At this time the split taper ring 38 may also be removed. The threads 37 therefore provide an effective means for preventing loss of the rings 35 and 38 without materially adding to the cost of fabrication of the connector assembly.

The actual gripping of the cable 17 by the connector 11 is provided by annular interior sawteeth or shearing edges 39 within the split ring 38. The split ring 38 is cut at 42 (shown in FIG. 3) so that the ring 38 may be contracted to cause the teeth 39 to bite into the jacket 18 of the cable 17. The teeth 39 are forced into the jacket 18 due to the action of the compression nut 14 which has a shoulder 41 which bears against the end of the split ring 38, and upon turning of the nut 14, drives the split externally tapered ring 38 into the correspondingly internally tapered ring 35 causing the teeth 39 to cut into the jacket 18. This sidewise movement of the nut assembly simultaneously forces the jacket 18 laterally so that the end of the jacket 18 is forced firmly against the shoulder 43 inside the connector body 12. The internal surface of the shoulder 41 and the surface of the split tapered ring 38 against which it bears are preferably smooth and rounded, so that there is a minimum of friction encountered as the shoulder 41 rotates against the plit tapered ring 38. As the nut 14 is screwed forward to the point where the inner wall of its flange abuts the threaded end of the outer ring 37, the longitudinal movement of the gripping means is limited. The shearing action of teeth 39 is thereby limited to a distance less than their pitch for reasons and for obtaining advantages which will be more fully explained hereinafter.

It should be noted that once the split tapered ring 38 is forced into the tapered ring 35, there is no relative rotational movement therebetween. This is due first to the fact that the area of surface contact, and hence of frictional engagement, between the rings 35 and 38 is much greater than the area of surface contact between the ring 38 and the shoulder 41. Secondly, as soon as the split tapered ring 38 begins to cut into the jacket 18 the cut 42 narrows in width and forms a ridge of material from the jacket 18 which thereafter further prevents rotational movement of the split tapered ring 38. The elimination of rotational movement between the two tapers is important due to the fact that successful operation of the connector requires freedom of sliding movement of the split tapered ring 38 within the tapered ring 35, and if substantial rotational movement is imparted, these rings will tend to seize and proper operation of the connector will be prevented.

It should be appreciated that a principal advantage of the present invention is that the amount of shearing cut made by the teeth 39 in the jacket 18 is not left to chance but is under close control to provide an eminently strong connection between the connector 11 and the jacket 18 and at the same time avoiding undue weakening of the jacket wall. As the nut 14 is tightened on the connector body 12, the split tapered ring 38 is forced axially into the tapered ring 35. As this takes the place the split tapered ring 38 is contracted until it begins to shear and bite into the jacket 18 of the cable 17 at some predetermined point. In FIG. 2 the rings 38 and 35 are shown at a point just before the split tapered ring 38 begins to shear and bite into the jacket 18 of the cable 17. As the nut 14 is tightened further, the teeth 39 in the ring 38 will continue to bite and shear into the jacket until the ring 38 is forced completely into the ring 35, at which point no further compression of the ring 38, and hence no further cutting of the teeth 39 is possible.

It is to be noted that the shearing edge of the teeth preferably is designed so that a true shearing action occurs. The rake of each tooth is preferably perpendicular to the axis of its travel during the assembly. The tooth relief is preferably relatively shallow and provides adequate support for the shearing edge. As the shearing edges advance upon tightening the assembly, a square shoulder and wave of material of the jacket 18 is established ahead of each tooth or shearing edge, thus further enhancing the locking action of the assembly.

It is readily possible to determine exactly where the teeth 39 will start to bite into the jacket since the dimension of the jacket 18 is known and the dimensions of the rings 35 and 38 are also known. This point where the teeth 39 first begin to bite is determined, so that the total distance traveled by the ring 38 during the biting or cutting of the teeth is less than the pitch of the teeth (the longitudinal distance between adjacent teeth). This is an important consideration since this construction prevents any one of the teeth cutting into the tube at a point already scored by a previous tooth. If one of the teeth should pass over a point previously scored by foregoing teeth, the depth of cut of that particular tooth and hence the strength of grip of the split ring 38 would be diminished. Furthermore, when succeeding teeth pass over a portion of the jacket already cut by previous teeth the cross-sectional area of the jacket wall is diminished and the strength of the jacket is decreased without any increase in the strength of the connector grip.

In addition to complete control of the length of cut of the teeth 39 the connector 11 provides complete control of the depth of cut of the teeth 39 in a tube or rod of known diameter. The depth of cut of the teeth 39 is not affected by the amount of force used to tighten the nut 14, but is rather determined in advance and results when the nut 14 is tightened to stop at the point where ring 38 is forced completely into ring 35 when ring 35 has an axial length at least as great as ring 38. When desired, however, ring 38 may be axially longer than ring 35, but the former relationship is preferred. When ring 38 is no longer than ring 35, and axial pressure is not applied to the assembly of the rings one inside the other, the springiness inherent in ring 35 exerts a constant tendency to cause ring 35 to tend to pop out of ring 38, facilitating disengagement of the assembly. Since the connector 11 allows the depth of cut of the teeth 39 to be subject to close control, the depth of cut can be determined to provide a maximum of gripping strength of connector 11 relative to the cable 17, and also, the weakening of the cable 17 due to the cutting action of the teeth can be held to a minimum.

This is best demonstrated by a specific example. Each tooth 39 has a substantially vertical wall and an oblique wall. The vertical wall is the one on the side in the direction of travel of the split ring 38 as the nut 14 is tightened. Assume that the wall of the jacket 18 is .070 inch thick. The cut of the teeth 39 may then be predetermined by design of the rings 35 and 38 to be .010 inch. In such a case each of the seven teeth 39 shears uniformly into the jacket 18 to a depth equal to one-seventh of the jacket thickness and thereby provides a gripping action equal to one-seventh of the total original strength of the cable jacket 18. Thus the total gripping action of the seven teeth 39 is equal to the original cable jacket strength. At the same time the thickness of the jacket wall at its weakest point will have been reduced by a factor of only one-seventh or less than 15%. Therefore the connector 11 grips the cable 17 with a gripping strength greater than the final strength of the cable jacket 17, and the strength of the weakest portion of the connection, namely the weakened portion of the cable 17 is still within 15% of the original strength of the cable itself. It will be particularly appreciated that exceptional strength is provided by the present connector when it is considered that many connectors of similar type produce a connection having a strength of only 50% or less than that of the tubing being connected, and the tubing is often weakened by an equal amount.

Figure 3:
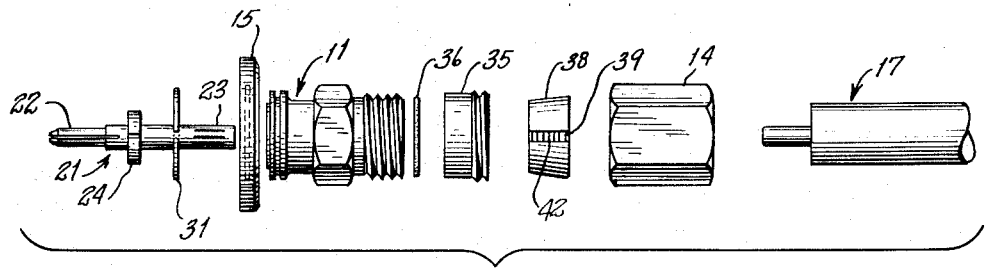
FIGURE 3 is an exploded view of the elements of the apparatus of FIGURE 2.

From the foregoing explanation, it will be understood that the electrical connector 11 shown in FIGS. 1, 2 and 3, provides a connection which is fluid-tight and furthermore may have a strength very nearly equal to or greater than that of the cable wall being connected. Furthermore, the connector provides an electrical structure which has very low D.C. resistance at all frequencies which are substantially the same as that of the cable 17 itself, and virtually no mechanical or dimensional irregularities are produced by the connector of this invention to interfere with the propagation of radio frequency energy through the cable 17 and connector 11.

Another advantage of the invention resides in ready and easy disassambly. Where the nut 14 is unscrewed or released, even after wrench-tight assembly, the cable may be disengaged by simply tapping the assembly. Loosening the nut 14 releases the ring 35 for longitudinal movement. The inherent resilience or springiness of the compressed split ring 38, pressed in sliding relation within its tapered confinement causes it to slide or pop out of the rigid ring 35.

It is obvious that many of the features of the particular connector shown may be eliminated where a connector is desired for other applications. As an example, it may in some cases be desired to connect an eye bolt to a tie rod. In such a case the many features of the connector body 12 which are useful in a radio frequency cable connector could be eliminated, and the connector body 12 may consist simply of an eye bolt structure having threads similar to 32 adapted to cooperate with the threads 33 of the compression nut 14. In this application the cable 17 would be replaced by a tie rod which might either be hollow or solid and which could be formed of any structural material such as iron, steel, aluminum or the like. Generally it will be desirable to form the connector of the same material or of a similar material to that of the rod or tube being connected. Thus a steel or stainless steel connector could be utilized for steel rods, an aluminum connector for aluminum rods, etc.

Another application for connectors according to the present invention is in the field of fluid conduits. In this application, as in the structural connector application, the features useful in the radio frequency electrical connector will generally not be required. On the other hand, for connecting copper water pipe it might be desirable to provide a connector similar to that shown in FIGS. 1 and 2, except with the left end formed in a manner similar to the right end as shown in FIGS. 1 and 2, so that the connector could be utilized for connecting two similiar pieces of copper tubing. Similarly, a connector may be provided for connecting one size of tubing to another. Also, a connector according to the present invention may be included as a part of a plumbing fixture so that copper tubing may be connected directly to the fixture without the necessity of soldering or other time consuming operations. Obviously many other forms of connectors may be devised utilizing the principles of the connector shown and of the present invention.

From the foregoinng explanation it will be appreciated that the present invention provides connectors of great simplicity and efficiency which are adaptable for use in numerous widely divergent types of applications. Although certain variations and modifications have been suggested hereinbefore, many further variations will be obvious to those having a knowledge of various arts in which connectors are utilized, and accordingly, the present invention is not to be construed to be limited to the particular embodiments of the invention shown or suggested. Rather, the invention is to be considered to be limited solely by the appended claims.

What is claimed is:

1. A connector assembly for providing a connection with cylindrical members comprising a connector body having a cylindrical externally threaded portion and a recess concentric with said threaded portion for receiving a rod or tube, a compression nut having an internally threaded portion near one end, an inwardly extending shoulder near the other end, and an intermediate portion of enlarged internal diameter, an internally tapered ring adapted to fit inside said nut between said shoulder and the end opposite said shoulder having an externally threaded portion corresponding to the threads of said compression nut, and an externally tapered longitudinally split ring having a taper mating with the taper of said internally tapered ring and a plurality of inwardly extending circumferential teeth on the inner surface thereof, said externally tapered ring having an outside minimum diameter in its compressed condition which is approximately equal to the inside minimum diameter of said internally tapered ring, said externally tapered ring further being adapted to fit within said internally tapered ring when the latter is placed within said compression nut and further having a smooth end surface adapted to abut against said shoulder of said compression nut to delimit relative longitudinal movement and allow relative rotational movement between said shoulder and said externally tapered ring, whereby a cylindrical member may be secured in said connector by tightening said compression nut after placing one end against said connector body and within said recess, said cylindrical member further being placed within said compression nut, said internally tapered ring and said externally tapered ring, each of the latter two elements being placed at least partially within the respective preceding element.

2. A connector assembly for providing a connection with a cylindrical member comprising a connector body, gripping means including a radially compressible circumferentially discontinuous member having an externally tapered surface with a slope less than 45°, a substantially cylindrical hole in said compressible member and a plurality of inwardly extending circumferential teeth on the inner cylindrical surface of said hole for shearing into and engaging said cylindrical member, said teeth having a predetermined pitch, means engageable with said connector body for longitudinally moving said gripping means toward said connector body, means for limiting longitudinal movement in the direction of movement of said gripping means of said cylindrical member relative to said connector body, means including an internally tapered surface arranged to be longitudinally immovable with respect to said connector body and adapted to co-operate with the tapered surface of the first said member for causing compression of said gripping means simultaneously with longitudinal movement of said gripping means toward said connector body to engage one of said cylindrical members by combined radial and longitudinal, but predominantly longitudinal, cutting action, and means for limiting the longitudinal movement of said gripping means while in shearing engagement with said cylindrical member to a distance not more than the pitch of said teeth, whereby a cylindrical member may be inserted in the hole in said compressible member and said compressible member may be simultaneously compressed and translated with respect to said cylindrical member to cause said teeth to longitudinally and radially sheer into said cylindrical member to secure said cylindrical member to said connector.

3. A connector assembly as claimed in claim 2 wherein the surfaces of said teeth facing away from said connector body have a slope substantially equal to that of said externally tapered surface and the surfaces of said teeth facing toward said connector body are substantially perpendicular to the axis of said cylindrical hole.

4. A connector assembly as claimed in claim 2 wherein said radially compressible member is a split ring of resilient material whereby a cylindrical member may be secured in said connector assembly without permanently deforming said split ring, and whereby the assembly is readily disassembled due to the tendency of the said resilient split ring to be urged out from said internally tapered surface.

5. A connector assembly as claimed in claim 4 wherein said means including an internally tapered surface comprises a peripherally continuous internally tapered ring having a maximum internal dimension somewhat less than the maximum external dimension of said split ring in uncompressed condition.

6. A connector assembly for providing a connection with a cylindrical member comprising a connector body, gripping means including a radially compressible circumferentially discontinuous member having an externally tapered surface, a hole in said compressible member and a plurality of inwardly extending circumferential teeth on the inner surface of said hole, means engageable with said connector body for longitudinally moving said gripping means toward said connector body, means for limiting longitudinal movement in the direction of movement of said gripping means of said cylindrical member relative to said connector body, means including an internally tapered surface arranged to be longitudinally immovable with respect to said connector body and adapted to co-operate with the tapered surface of the first said member for causing compression of said gripping means simultaneously with longitudinal movement of said gripping means toward said connector body to engage one of said cylindrical members by combined radial and longitudinal cutting action, and means for limiting the longitudinal movement of said gripping means while in shearing engagement with said cylindrical member to a distance not more than the pitch of said teeth.

7. A connector assembly for providing a connection with a cylindrical member comprising a connector body, gripping means including a radially compressible split ring of resilient material having a frusto-conically externally tapered surface with a slope less than 45°, a substantially cylindrical hole in said ring and a plurality of inwardly extending circumferential teeth on the inner cylindrical surface of said hole for shearing into and engaging said cylindrical member, means engageable with said connector body for longitudinally moving said gripping means toward said connector body means for limiting longitudinal movement in the direction of movement of said gripping means of said cylindrical member relative to said connector body, and means including a frusto-conically, internally tapered surface arranged to be longitudinally immovable with respect to said connector body and adapted to co-operate with the tapered surface of said split ring for causing compression of said ring simultaneously with longitudinal movement of said split ring toward said connector body to engage one of said cylindrical members by combined radial and longitudinal, but predominantly longitudinal, cutting action, whereby a cylindrical member may be secured in said connector assembly without permanently deforming said split ring, and the assembly is readily disassembled due to the tendency of said resilient spilt ring to be urged out from said internally tapered surface.

8. A connector assembly for providing a connection with a cylindrical member comprising a connector body, gripping means including a radially compressible circumferentially discontinuous member having a frusto-conically externally tapered surface with a slope less than 45°, a substantially cylindrical hole in said compressible member, and a plurality of inwardly extending circumferential teeth on the inner cylindrical surface of said hole for shearing into and engaging said cylindrical member, means engageable with said connector body for longitudinally moving said gripping means toward said connector body, means for limiting longitudinal movement in the direction of movement of said gripping means of said cylindrical member relative to said connector body, and means including a frusto-conically, internally tapered surface arranged to be longitudinally immovable with respect to said connector body and adapted to co-operate with the tapered surface of the first said member for causing compression of said gripping means simultaneously with longitudinal movement of said gripping means toward said connector body to engage one of said cylindrical members by combined radial and longitudinal, but predominantly longitudinal, cutting action, whereby a cylindrical member may be inserted in the hole in said compressible member and said compressible member may be simultanously compressed and translated with respect to said cylindrical member to cause said teeth to longitudinally and radially shear into said cylindrical member with predominantly longitudinal motion to secure said cylindrical member to said connector.

References Cited in the file of this patent

UNITED STATES PATENTS

| | | |
|---|---|---|
| 670,363 | Walker | Mar. 19, 1901 |
| 1,109,836 | Hanson | Sept. 8, 1914 |
| 1,646,660 | Prince | Oct. 25, 1927 |
| 1,710,416 | Goeller | Apr. 23, 1929 |
| 2,443,635 | Morris et al. | June 22, 1948 |
| 2,494,639 | Yates | Jan. 17, 1950 |
| 2,544,712 | Miller | Mar. 13, 1951 |
| 2,666,659 | Audemar | Jan. 19, 1954 |
| 2,699,589 | Redell | Jan. 18, 1955 |
| 2,757,053 | Green | July 31, 1956 |

FOREIGN PATENTS

| | | |
|---|---|---|
| 675,082 | Great Britain | July 2, 1952 |
| 914,921 | Germany | July 12, 1954 |
| 1,058,728 | France | Nov. 4, 1953 |